2,941,919
SIZING OF PAPER

Spencer H. Watkins, Wilmington, Del., assignor to Hercules Powder Company, Wilmington, Del., a corporation of Delaware No Drawing. Filed Jan. 31, 1957, Ser. No. 637,354

5 Claims. (Cl. 162—180)

This invention relates to the sizing of paper with rosin sizes derived from tall oil rosin.

An important object of the present invention is the provision of an improved process for the sizing of paper with tall oil rosin sizes wherein increased sizing efficiency is obtained with resultant economies in operation.

The invention herein is based on the discovery that the sizing efficiency of rosin sizes derived from tall oil rosin may be improved if, prior to size formation, the tall oil rosin is reacted with a small amount of formaldehyde, or a formaldehyde-yielding material, in the presence of an acid catalyst.

In carrying out the process of the invention, tall oil rosin is first reacted with formaldehyde or a formaldehyde-yielding material, at a temperature above 100° C., and preferably between 100 and 200° C., in the presence of an acid catalyst for a period of time from about 10 minutes to about 4 hours. The thus-treated tall oil rosin is then converted into size in the usual, or any well-known manner, as by melting the rosin, adding sufficient water and alkali, such as caustic soda, soda ash, or the like, to give the desired total solids and free rosin, and stirring until a smooth paste is obtained. The resulting size is then utilized for sizing in the conventional manner, namely, by mixing a dilute aqueous dispersion of the size with an aqueous suspension of paper pulp and then precipitating the rosin on the paper fibers by adding to the suspension a small quantity of papermaker's alum (aluminum sulfate).

The dispersed tall oil rosin size, prepared as described, may be added to the aqueous pulp suspension in varying amounts, depending upon the results desired, but is usually added in amounts between about ¼% and about 4%, by weight of the size, based on the weight of dry pulp. The amount of alum added may vary from about 1% to about 5% but will usually be from about 1% to 2% by weight of the dry pulp.

Having described the invention generally, the following examples are given to illustrate specific embodiments thereof. Parts given are by weight unless otherwise specified.

EXAMPLES 1–12

Samples of tall oil rosins, which were prepared by fractional distillation at reduced pressures, were reacted with varying amounts of formaldehyde in the following manner. The rosin was melted and with good agitation 0.1% concentrated sulfuric acid was added, followed immediately by aqueous formaldehyde introduced under the surface of the molten rosin. Throughout the addition of the formaldehyde, the temperature of the rosin was maintained between about 140 and 150° C. Water was allowed to escape from the reaction and was collected by condensation. Analysis of the aqueous condensate for formaldehyde showed that more than 90% of the formaldehyde had reacted with the rosin.

After the addition of all the formaldehyde, the temperature of the rosin was raised to 150–175° C. and maintained there until completely dry. Time required for addition of the formaldehyde varied between 30 and 60 minutes. For addition requiring longer than 30 minutes, additional sulfuric acid was added at 30-minute intervals to replace that used up during the reaction. The amount of sulfuric acid added should be kept as low as possible, preferably below 1%. Drying time varies with temperature but will usually be about ½ to 6 hours. The percent formaldehyde was as 100% formaldehyde based on the rosin.

Paste sizes were prepared from the tall oil rosin samples, which had been reacted with formaldehyde in the manner described above, and from corresponding samples which had not been so treated. The sizes were cooked in the usual manner by melting the rosin, adding sufficient water and caustic to give the desired total solids and free rosin, and stirring until a smooth paste was obtained.

The sizes so prepared were then utilized in sizing paper in accordance with the following procedure. Bleached kraft pulp was beaten to a Schopper-Riegler freeness of 750±10 cc. at 4.5% pulp consistency. This pulp was diluted to 2.5% consistency with pH 7 water and the proper amount of size added as an aqueous dispersion containing about 3% rosin size solids. Sufficient papermaker's alum was then added to lower the pH of the slurry to 4.5. The stock was then diluted to 0.25% consistency with pH 4.5 water and sheets of paper made in a Noble and Wood handsheet machine at 0.025% consistency using recycle water for the latter dilution. The sheets were then pressed and dried and conditioned 48 hours at 70° C., 50% relative humidity and tested for sizing utilizing the Hercules photometer. The results are shown in the table below.

Table

| Example No. | Type Rosin | Sizing (sec.)—Hercules Photometer | | | |
|---|---|---|---|---|---|
| | | 0.75% Size | 1.5% Size | 2.25% Size | 3.0% Size |
| 1 | Tall Oil Rosin A | 43 | 100 | 110 | 122 |
| 2 | Rosin A+2% HCHO | 56 | 116 | 143 | 165 |
| 3 | Tall Oil Rosin B | | 94 | 109 | |
| 4 | Rosin B+2.5% HCHO | | 112 | 133 | |
| 5 | Tall Oil Rosin C | 70 | 153 | | |
| 6 | Rosin C+2.5% HCHO | 92 | 175 | | |
| 7 | Tall Oil Rosin D | 85 | 190 | 223 | |
| 8 | Rosin D+2.5% HCHO | 115 | 211 | 237 | |
| 9 | Tall Oil Rosin E | 34 | 97 | 153 | |
| 10 | Rosin E+3% HCHO | 49 | 136 | 188 | |
| 11 | Tall Oil Rosin F | 29 | 99 | 126 | |
| 12 | Rosin F+3% HCHO | 43 | 116 | 140 | |

The examples clearly show the improvement in sizing efficiency obtained when paper is sized with tall oil rosin sizes made from tall oil rosins treated as herein described. Thus, it is possible to obtain a greater degree of sizing utilizing the treated tall oil rosin in the same amounts as the untreated tall oil rosin, or an equivalent degree of sizing utilizing less of the treated tall oil rosin.

The amount of formaldehyde or formaldehyde-yielding material to be reacted with the tall oil rosin in the preparation of the tall oil rosin sizes utilized herein may vary from about 1% to about 4% by weight, based on the weight of the tall oil rosin. Thus, amounts below about 1% do not give the desired increase in sizing efficiency while amounts above about 4% adversely affect sizing efficiency. My preferred range for the amount of formaldehyde to be reacted with the tall oil rosin is from about 2% to about 3%, based on the weight of rosin. The formaldehyde may be used as such or in any form which, in the presence of acid and heat, will yield free formaldehyde such as paraformaldehyde, methylal and so on.

The reaction between the tall oil rosin and the formaldehyde is carried out in the presence of an acid catalyst at temperatures from about 100° C. to about 200°

C. and preferably from about 125° C. to about 175° C. The time of reaction may vary from about 10 minutes to about 4 hours and will usually be from about ½ hour to about 2 hours.

In general, the amount of acid catalyst employed may vary from about 0.05% to about 1%, by weight, based on the weight of tall oil rosin. However, it is preferred to utilize from about 0.1% to about 0.5% catalyst based on the weight of rosin. The preferred catalyst for the purpose is sulfuric acid. However, any strongly acidic material such as mineral acids, formic acid, acetic acid, p-toluene sulfonic acid, Friedel-Crafts type acids such as zinc chloride, boron trifluoride, acidic clays and so on may be used.

Following the described treatment, the tall oil rosin is formed into size by saponification with alkalies in the usual or any well-known manner. Thus, in preparing liquid rosin sizes, the rosin may be heated with an aqueous solution of sodium or potassium carbonate at about 190–212° F. for about 6 hours. About 9–16% by weight of the carbonate, based on the weight of the rosin, will usually be employed. In the preparation of dry rosin sizes, the rosin may be reacted with from about 9% to about 12% of sodium or potassium hydroxide in the form of a relatively concentrated aqueous solution to produce the dry size directly. The dry size may also be produced by subjecting the liquid size, prepared as described above, or a paste size to evaporation on a drum dried or by spray-drying.

The tall oil rosin sizes, prepared as above indicated, are added to an aqueous suspension of paper fibers, such as in the beater of the usual papermaking machine or at any other time prior to web formation, in an amount such as to supply from about ¼ to 4% of rosin based on the weight of dry pulp. A small amount of alum, i.e., from about 1–5%, based on the weight of dry pulp, is then added to the aqueous suspension of pulp to precipitate the rosin on the fibers following which the paper is sheeted and processed in the conventional manner.

The process of the invention appears to be uniquely applicable to rosin sizes prepared from tall oil rosin. While tall oil rosin varies somewhat depending on its derivation and method of recovery and purification, the following are typical properties of products of this type prepared by fractional distillation at reduced pressures.

Acid number _____ 168–172
Saponification number _____ 172–178
Softening point (ring and ball) _____° C__ 78–85
Resin acids (percent) _____ 89.0–91.0
Fatty acids (percent) _____ 1–3
Ultraviolet:
    Total abietic-type acid (percent) _____ 45–55
    Dehydroabietic acid (percent) _____ 15–20
Color (USDA rosin color scale) _____ N–WG
Specific rotation _____ −5.0 to +5.0

It will thus be seen that the present invention provides increased sizing efficiency for tall oil rosin sizes when employed in the sizing of paper in accordance with procedures conventionally used in the art. While preferred embodiments of the invention have been specifically described herein, the invention is not to be construed as limited thereby except as the same may be included in the following claims.

What I claim and desire to protect by Letters Patent is:

1. The process of sizing paper which comprises adding to an aqueous suspension of paper pulp an aqueous and at least partially neutralized dispersion of tall oil rosin, in an amount such as to supply from about ¼ to about 4% of the rosin, based on the weight of dry pulp, in said suspension, said tall oil rosin having been subjected to treatment with from about 1% to about 4%, based on the weight of tall oil rosin of a material selected from the group consisting of formaldehyde and formaldehyde-yielding materials, at a temperature of from about 100° C. to about 200° C. in the presence of an acid catalyst prior to saponification with aqueous alkali.

2. The process of sizing paper which comprises adding to an aqueous suspension of paper pulp an aqueous and at least partially neutralized dispersion of tall oil rosin in an amount such as to supply from about ¼ to about 4% of the rosin, based on the weight of dry pulp, in said suspension, said tall oil rosin having been subjected to treatment with from about 1% to about 4%, based on the weight of tall oil rosin of formaldehyde at a temperature of from about 100° C. to about 200° C. in the presence of from about 0.05% to about 1%, based on the weight of rosin, of an acid catalyst prior to saponification with aqueous alkali.

3. The process of sizing paper in accordance with claim 2 in which the acid catalyst is sulfuric acid.

4. The process of sizing paper in accordance with claim 2 in which the acid catalyst is p-toluene sulfuric acid.

5. Paper sized with from about ¼ to about 4% of tall oil rosin which has been subjected to treatment with from about 1 to about 4% of formaldehyde, based on the weight of rosin, at a temperature from about 100° C. to 200° C. in the presence of an acid catalyst and then saponified with aqueous alkali.

References Cited in the file of this patent

UNITED STATES PATENTS

| | | |
|---|---|---|
| 2,084,213 | Osterhof | June 15, 1937 |
| 2,197,383 | Outterson | Apr. 16, 1940 |
| 2,684,300 | Wilson | July 20, 1954 |
| 2,712,994 | Niles | July 12, 1955 |
| 2,720,514 | Rummelsburg | Oct. 11, 1955 |
| 2,744,889 | Gayer | May 8, 1956 |